US006285395B1

(12) United States Patent
Firpo

(10) Patent No.: US 6,285,395 B1
(45) Date of Patent: Sep. 4, 2001

(54) EARTH SENSOR FOR SATELLITE

(75) Inventor: Thomas J. Firpo, Lakewood, CA (US)

(73) Assignee: Hughes Electonics Corporation, El Segundo, CA (US)

( * ) Notice: Subject to any disclaimer, the term of this patent is extended or adjusted under 35 U.S.C. 154(b) by 0 days.

(21) Appl. No.: 08/691,219

(22) Filed: Jul. 31, 1996

Related U.S. Application Data

(63) Continuation of application No. 08/154,326, filed on Nov. 18, 1993, now abandoned.

(51) Int. Cl.[7] .................................................. H04N 7/18

(52) U.S. Cl. .............................................................. 348/144

(58) Field of Search .................................... 244/159, 164, 244/171, 173; 250/203.1, 203.6, 206.2; 348/113, 117, 144, 147, 116, 123; 359/11; 701/4, 13, 222, 226; H04N 7/18

(56) References Cited

U.S. PATENT DOCUMENTS

| 3,869,705 | * | 3/1975 | Woywood | 348/144 |
| 4,364,085 | * | 12/1982 | Dalke | 348/144 |
| 4,679,753 | * | 7/1987 | Landecker | 250/203 R |
| 4,688,091 | * | 8/1987 | Kamel et al. | 348/147 |
| 4,688,092 | * | 8/1987 | Kamel et al. | 348/113 |
| 4,689,748 | * | 8/1987 | Hofmann | 348/117 |
| 4,746,976 | * | 5/1988 | Kamel et al. | 348/117 |
| 4,944,587 | * | 7/1990 | Harique | 250/203.6 |
| 5,029,220 | * | 7/1991 | Juday | 382/6 |
| 5,107,351 | * | 4/1992 | Leib et al. | 359/11 |
| 5,189,295 | * | 2/1993 | Falbel | 250/206.2 |

* cited by examiner

Primary Examiner—Richard Lee
(74) Attorney, Agent, or Firm—T. Gudmestad

(57) ABSTRACT

An earth sensor for a communication satellite is provided which utilizes a camera for viewing the earth from the satellite and an optical correlator which optically processes the video data from the camera to provide attitude information to a satellite attitude control computer.

6 Claims, 3 Drawing Sheets

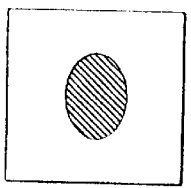
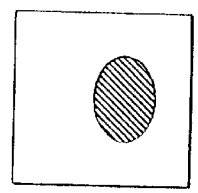
Fig. 3a  Fig. 3b
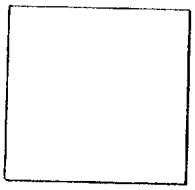
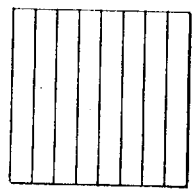
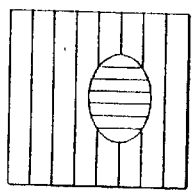
Fig. 4a  Fig. 4b  Fig. 4c
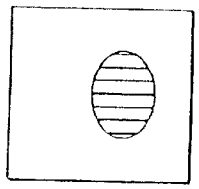
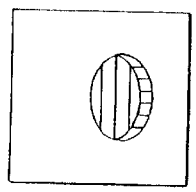
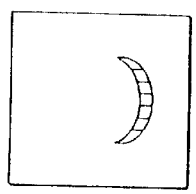
Fig. 4d  Fig. 4e  Fig. 4f
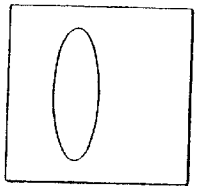
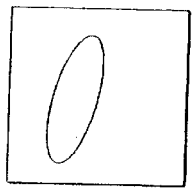
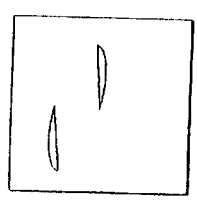
Fig. 5a  Fig. 5b  Fig. 5c
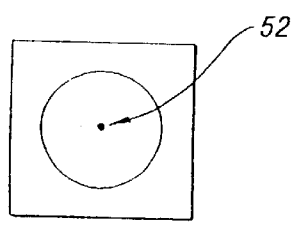
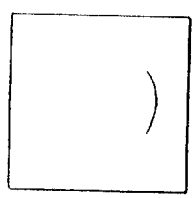
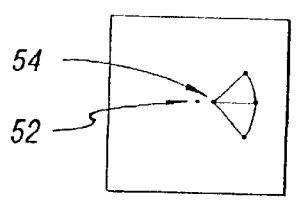
Fig. 6a  Fig. 6b  Fig. 6c

EARTH SENSOR FOR SATELLITE

This is a continuation of application Ser. No. 08/154,326, filed Nov. 18, 1993 now abandoned.

TECHNICAL FIELD

This invention relates to earth sensors for providing spacecraft attitude information and more particularly to an earth sensor for a satellite which utilizes a camera for viewing the earth from the satellite and an optical correlator which optically processes the data from the camera to provide accurate attitude information to the satellite attitude control system.

BACKGROUND ART

An earth sensor is a critical component of a communication or remote sensing satellite's attitude control subsystem. It is generally desirable to maintain a communications or remote sensing satellite in a geosynchronous orbit about the earth so as to enable a communication beam or sensor field of view from the satellite to accurately cover a desirable area, such as a particular country, on the surface of the earth. Any deviations from this orbit will alter the coverage of the beam or view. Accordingly, satellites are provided with sensors for sensing changes in orientation of the satellite relative to the earth.

One prior art earth sensor relies on infrared radiation focused on thermally sensitive detectors. Another relies on the intensity of visible and ultraviolet radiation from the earth disk. The earth as seen from space does not always have the same shape in the visible light spectrum. It is therefore difficult to design a video earth sensor which accommodates this characteristic without providing prohibitively large and complex data processing capabilities.

SUMMARY OF THE INVENTION

According to the present invention a video earth sensor for a geosynchronous satellite is provided which utilizes a camera for viewing the earth from the satellite and an optical correlator which optically processes the video data from the camera to provide accurate attitude information to the satellite attitude control system. The optical correlator uses two Magneto-Optic Spatial Light Modulators (MOSLMs). MOSLMs are well known in the art and have been used in target and pattern recognition applications. In contrast to the prior art pattern recognition systems, the pattern of interest in the present invention, namely the earth as seen from orbit, is of a known and slowly changing shape. It is the shape and orientation of the earth as seen by the camera which gives the satellite attitude control system the attitude information it requires. The sensor of the present invention relies on the fact that although the earth does change shape over the course of a day, as well as over the course of a year, it does so relatively slowly. The rate at which MOSLMs can be readdressed is very fast (120 frames per second) and thus real-time or near real-time comparison from one frame to the next is possible. Comparison of the current picture of earth with those of the very recent past can give data on the location of the earth within the scene as well as orientation. The changing shape of the earth is essentially filtered out or eliminated.

BRIEF DESCRIPTION OF THE DRAWINGS

A more thorough understanding of the present invention may be had from the following detailed description that should be read with the drawings in which:

FIGS. 3a and 3b show previous and current views of earth showing an attitude change;

FIGS. 4a–4f show the light incident on various correlator elements;

FIGS. 5a–5c show yaw data as collected with a single camera;

FIGS. 6a–6c show video data useful in calibrating the earth sensor and in determining pitch and roll information from the data.

DESCRIPTION OF PREFERRED EMBODIMENT

Figure 1:
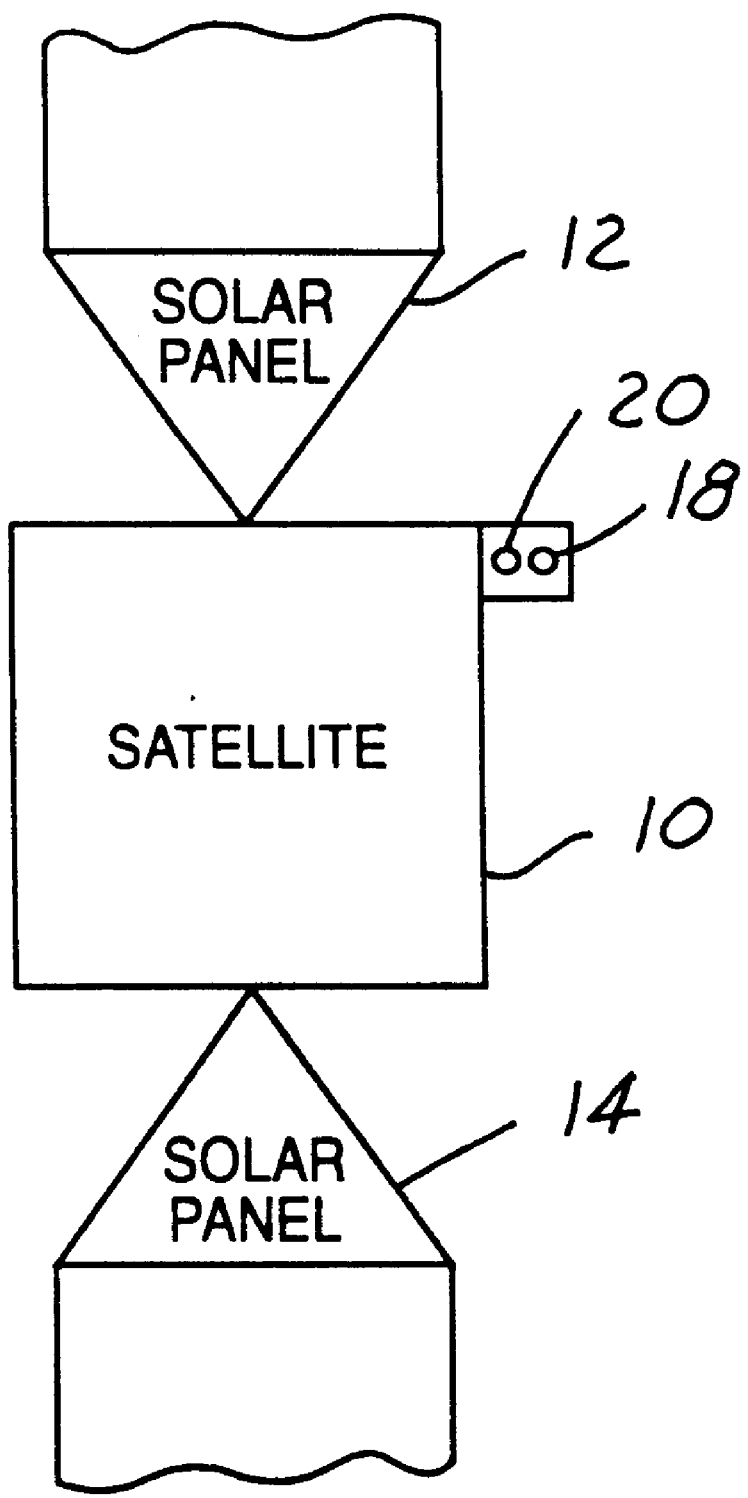
FIG. 1 shows a satellite with two earth sensing camera mounted thereon.
Figure 2:
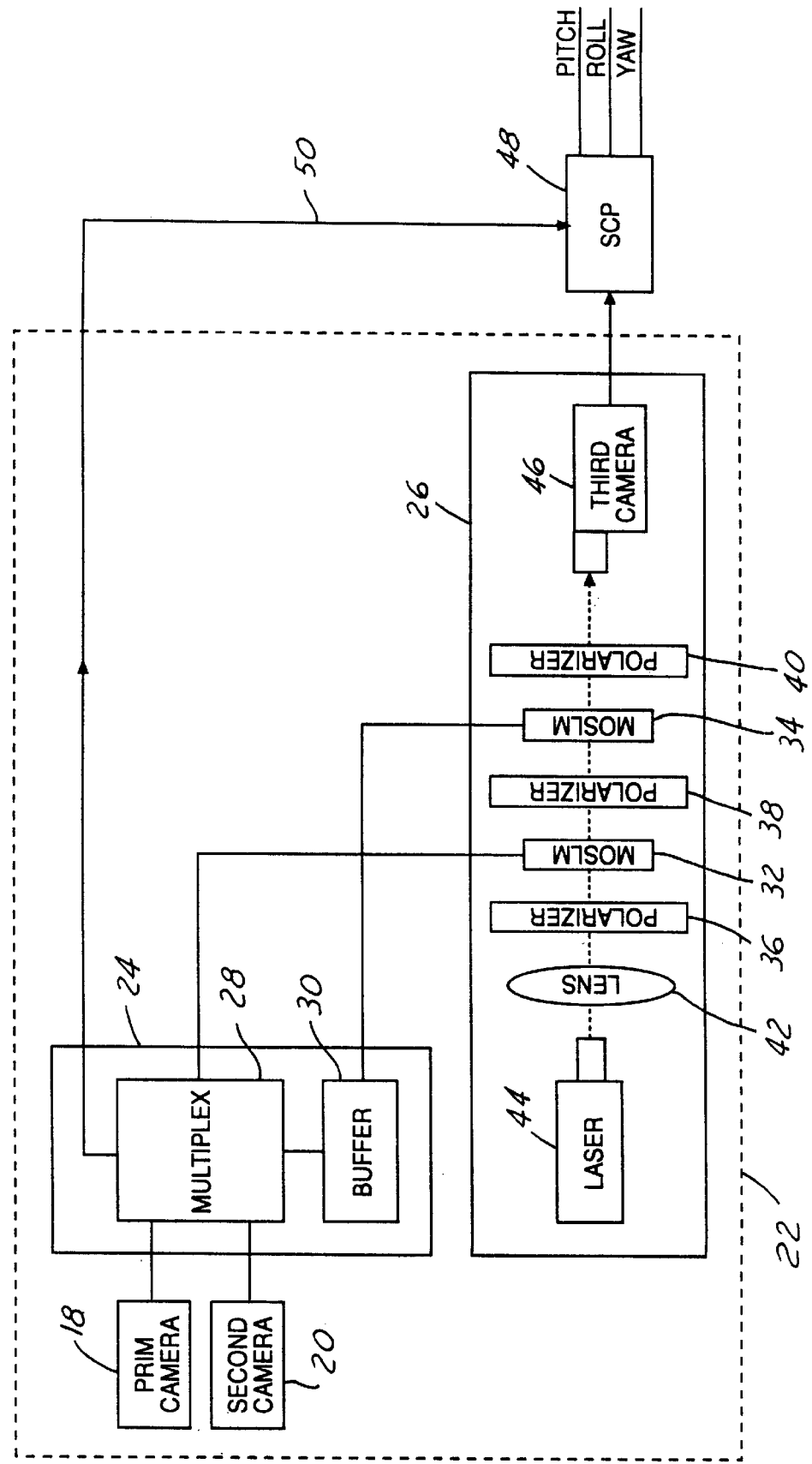
FIG. 2 is a functional schematic diagram of a preferred embodiment of the invention.

Referring now to the drawings and initially to FIG. 1, a satellite generally designated 10 is provided with the usual solar panels 12 and 14 which provide a source of power for operating the various electrical loads on the satellite. The video earth sensor of the present invention is generally designated 16, in FIG. 2, and comprises a primary camera 18 and a secondary camera 20 appropriately mounted on the satellite 10 as shown in FIG. 1. Referring to FIG. 2, the output of the cameras 18 and 20 is provided to an image processor generally designated 22 which includes a MOSLM translator generally designated 24 and an optical correlator generally designated 26. The MOSLM translator 24 converts or translates video data from the cameras 18 and 20 into MOSLM pixel addresses. The translator 24 multiplexes data from the two cameras to the correlator using a multiplexer 28 and stores frame data in a storage buffer 30.

The correlator 26 includes MOSLMs 32 and 34, a vertical polarizer 36, horizontal polarizers 38 and 40 and a lens system generally designated 42. The light source for the correlator 26 may include one or more solid state lasers generally designated 44. The optical output of the correlator 26 is presented to a third camera 46 which converts the optical data to electrical signals for input to a satellite control processor (SCP) 48. The SCP 48 derives attitude control information from the signals supplied from the cameras 18 and/or 20 and the camera 46 representing pitch, roll or yaw movement of the satellite from a desired pointing direction toward the earth. The beam of light from the laser 44 is adjusted by the lens system 42, which may include a plurality of lenses, in order to supply parallel light over the surface area of the MOSLMs. The SCP 48 may also receive earth view data directly from the camera 18 as indicated at 50, without being filtered through the correlator 26, for use in calibration of the sensor.

The operation of the sensor is as follows considering first the pixel data presented to the correlator 26 as a result of the view of the earth from camera 18 only. The data from camera 18 is input to the MOSLM translator 24, via the multiplexer 28 where it is translated from the pixel addresses of the camera picture to the appropriate pixel addresses of the MOSLM so that the pixel data of the MOSLM corresponds to the view of the earth as seen by the camera 18. After translation, the data from the camera 18 is stored in the buffer 30. The current or present output of the translator 24 is used to program the MOSLM 32, i.e. magnetize the individual pixels of the MOSLM 32 to the appropriate state to correspond to the pixel data of the current earth scene, as viewed by the camera 18. Similarly, the delayed pixel data from the buffer 30 is used to programs the MOSLM 34 with the previous scene's pixel data. Programming the MOSLMs 32 and 34 means setting those pixels of the MOSLM, representing the earth in the scene, to a state which causes a 90 degrees rotation of the polarization state of any light transmitted through those pixels. Also, those pixels of the MOSLM, representing the earth's background in the scene, are set to a state which produces no polarization shift of light passing through those MOSLM pixels. How often the previous and current pixel data is compared, and whether succeeding frames are compared or a number of frames are skipped between comparisons is a tradeoff between performance and MOSLM translator complexity and capability.

Referring now to FIGS. 3a–3b, a previous view (3a) and current view (3b) of the earth, as seen by camera 18, is shown. The difference in the two views represents an attitude shift about the pitch axis. The correlator 26 provides a video output to the camera 46 representing this difference.

FIGS. 4a–4f show the effect of each of the optical elements of the correlator 26 on the light from laser 44 as it passes through the correlator 26 and enters the camera 46. The beam of the laser 44, is adjusted with any required lenses to supply parallel light over the surface area of the two MOSLMs 32 and 34. The light incident on polarizer 36 is depicted in FIG. 4a and is vertically polarized by the polarizer 36. The vertically polarized light incident on MOSLM 32 is depicted in FIG. 4b. This light is acted upon by the MOSLM 32 in accordance with the manner in which it is programmed i.e. the light passing through the MOSLM pixel locations corresponding to the earth, is rotated by 90 degrees, while the light passing through the MOSLM pixel locations corresponding to the background is unchanged. The light exiting the MOSLM 32 is incident on the polarizer 38 as depicted in FIG. 4c where it is horizontally polarized, thereby rejecting all of the background light. The horizontally polarized light corresponding to the earth passes through the polarizer 38 and is incident on the MOSLM 34 as shown in FIG. 4d. The light falling on MOSLM 34 carries the data of the current earth view encoded via polarization. The MOSLM 34 does not affect the light incident upon those pixel locations corresponding to the background of a previous scene. The MOSLM 34 rotates the light, by 90 degrees, which passes through those pixel locations which have been magnetized to represent the earth in the previous scene. As shown in FIG. 4e, if the previous scene does not match the current scene, some light of both vertical and horizontal polarization will be incident on the polarizer 40. If the scenes are identical, then all of the light incident on the polarizer 40 will be vertically polarized, because it will have undergone two 90 degree rotations. If the two scenes are identical no light will fall on camera 46, since all the vertically polarized light will be rejected by the horizontal polarizer 40. If the scenes are different there will be some horizontally polarized light which passes through the polarizer to fall on the camera 46 as shown in FIG. 4f. This light represents the difference between the position of the earth in the two scenes, the background light having been rejected by the polarizer 38.

The image viewed by the camera 46 is converted to pixel data and input to the SCP 48. If the data input to the SCP 48 by the camera 46 is indicative of a completely blank scene, the data is interpreted by the SCP as indicating that the spacecraft has not undergone any attitude changes. If an image is present, four things could have happened, which can be determined by the SCP 48.

1) If the earth moves within the scene of camera 18, the data from the camera 46 identifies the direction and amount of motion in roll and/or pitch.

2) If the earth changes orientation within the scene of camera 18, the data from the camera 46 identifies the direction and amount of yaw motion of the spacecraft. This only applies if the earth's visible view is oblong as depicted in FIGS. 5a–5c. FIGS. 5a and 5b show the first and second video frames respectively, and FIG. 5c depicts the image seen by the camera 46. While FIGS. 5a–5c depict earth as viewed by a visible light camera, other types of cameras responsive to another part of the spectrum can be used as long as the camera provides pixel data output. It will be appreciated that if a visible light camera is used and the earth in the scene is full, or eclipsed, conditions which exist less than 2% of the time, yaw information is not available. Such conditions occur at noon and midnight near the time of the vernal equinoxes. If it is essential to detect Yaw at all times with the earth sensor, the visible light camera 18 may be replaced by an infra-red (IR) or other type camera which has a non-circular view of the earth. An IR camera or detector provides a non-circular view by distinguishing thermal features of the earth. Some possible thermal features to be viewed are the warm belt of the equator, or the cold nodes at the poles. With an IR camera, yaw can be detected from views presented to the camera 46 similar to those shown in FIGS. 5a–5c for visible light camera.

3) A combination of 1) and 2).

4) If the earth changes shape i.e. grows larger, as seen by camera 18, the change will not be detected by camera 18 since the position of the earth is unchanged, and the current earth scene programmed in MOSLM 32 is larger and eclipses the smaller previous earth scene programmed in MOSLM 34. As the earth's shape grows smaller there will be a distinct signature which distinguishes it from a movement, that is, pixels on both sides of the earth scene will be viewed by the camera 46. They will also be recognizable by their periodicity.

As indicated above if the camera 18 is a visible light camera and acting alone, it cannot detect yaw rotation 100% of the time because it relies on the oblong visual shape of the earth for this rotational movement. This drawback can be eliminated by using a camera which portrays the earth in a non-circular manner. An IR camera, for example, would permit unambiguous detection of yaw rotation by relying on the pixel data portraying the thermal features of the earth, i.e. the poles or the equator. Alternatively, instead of this substitution, the secondary camera 20, which detects a different portion of the spectrum, such as infra-red or ultraviolet radiation, may be added. By adding the second camera other benefits are derived such as greater bias capability and different resolution modes. Bias capability could be implemented by adjusting the lenses on the second camera 20 to view the earth as a smaller image than the first camera 18. This will allow the image to be moved around in the camera view during on-orbit calibration. By using different lenses on the two camera, slight motions of the spacecraft would not cause loss of the view of earth. For example, if the spacecraft antenna is not pointing in the proper direction following launch, it is desirable to manipulate the spacecraft to achieve the desired pointing. With two cameras such spacecraft movements are not likely to lose sight of the earth.

If two cameras are used the translator 24, and correlator 26 are time shared by the two cameras so that the description above with reference to the programming of the MOSLM's and processing of the laser beams in connection with the scene viewed by the camera 18 is also applicable to camera 20. Consequently the image presented to the camera 46 is alternately the difference between the present and previous scene viewed by camera 18 and the difference between the present and previous scene viewed by camera 20.

There are several ways of processing the data from the camera 46 to determine satellite attitude information. One method chosen for its simplicity could be used effectively with an IR camera viewing the full disk of the earth. There would be no yaw motion detection however, using this method. During the initial in-orbit checkout, while most of the spacecraft calibrations are being performed, a calibration of the earth sensor can be done. This task would be to find which pixel of the correlator camera represents the centroid of the earth view. This pixel represents the reference from which motion is detected. It is the desired centroid for the spacecraft mission and is identified by the numeral 52 in FIG. 6*a*.

As was discussed earlier, when the spacecraft is in operation and there is no movement, there is no sensor output, there are no lit pixels. When motion occurs pixels are lit in the correlator camera 46 which represent the edge of the earth in the direction of the motion. FIG. 6*b* shows pictorially what the camera 46 views and produces as pixel data to the SCP 48. FIG. 6*b* shows a pitch motion of the satellite in which the field of view of the sensor moves to the west when viewed from the earth's coordinate system.

The SCP 48 takes a minimum of three points from the curve in FIG. 6*b* and calculates a current centroid of the earth. The current centroid identified by the numeral 54 in FIG. 6*c*, is compared with the desired centroid 52 to unambiguously provide the magnitude and direction of the rotation or can be used with a nulling routine until the current centroid 54 is moved back to the location of the desired centroid 52.

While the forms of the invention herein disclosed are presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. An earth sensor for a satellite, said sensor comprising:
    a first camera mounted on the satellite for viewing a first scene and a second scene including an image of the earth against a background of space, said first camera generating video data,
    an image processor for processing the video data from said first camera to develop output pixel data containing pitch, roll and yaw information representing movement of the earth from said first and second scenes, said yaw information derived from the image of the earth, and
    wherein said image processor comprises:
        storage means for storing video data from said first camera representing said first scene, and
        an optical correlator for comparing video data representing the first and second scene, to detect movement of the earth relative to the first camera and to provide said output pixel data defining the distance and direction of said movement, which said optical correlator rejects the background of space as viewed by said first camera.

2. An earth sensor for a satellite, said sensor comprising;
    a first camera mounted on the satellite for viewing a first scene and a second scene including an image of the earth against a background of space, said first camera generating video data,
    an image processor for processing the video data from said first camera to develop output pixel data containing pitch, roll and yaw information representing movement of the earth from said first and second scenes, said yaw information derived from the image of the earth, and
    wherein said image processor comprises:
        an optical correlator including first and second magneto-optical light modulators having pixel locations, and first, second and third light polarizers, said first magneto-optical light modulator being located between said first and second light polarizers and said second magneto-optical light modulator being located between said second and third light polarizers, a light source for providing parallel light rays through said first and second magneto-optical light modulators, said optical correlator emitting polarized light,
        a correlator camera responsive to the polarized light emitting from said optical correlator for providing pixel output data,
        a translator having video data from said first and second scenes, said translator controlling said first magneto-optical light modulator to rotate, by 90 degrees, the parallel light rays passing through the pixel locations corresponding to the second scene while passing the parallel light rays, without rotation, at other pixel locations,
        said translator also controlling said second magneto-optical light modulator to rotate, by 90 degrees, the parallel light rays passing through the pixel locations corresponding to the first scene while passing the parallel light rays, without rotation, at said other pixel locations, and
        said first, second, and third light polarizers being effective to block passage of light rays from said source to said correlator camera whereby a difference in the first and second scenes as viewed by said first camera is presented to said correlator camera.

3. The invention defined in claim 2 wherein said sensor comprises a second camera mounted on said satellite, said second camera also generating video data, and
    said translator comprises a multiplexer for receiving video data from said first and second cameras, and a buffer for storing a scene viewed by each of said first and second cameras.

4. The invention defined in claim 3 wherein said first camera is responsive to the visible light portion of the spectrum and said second camera is responsive to a different portion of the spectrum.

5. A method of sensing movement of the earth relative to a first camera mounted on a spacecraft for viewing a first and second scene of the earth against a background of space, comprising the steps of;
    producing pixel data from said first camera representing the first and second scenes of the earth including the background of space,
    optically processing the pixel data to remove the background while producing a correlated image representing a difference between said first and second scenes, and
    viewing said correlated image with a second camera to produce pixel data representing said difference.

6. The method defined in claim 5 wherein the processing step includes:
    programming a first magneto-optical modulator with pixel data representing the second scene of the earth and the background, programming a second magneto-optical modulator with pixel data representing the first scene of the earth and the background, directing light rays through said first and second magneto-optical light modulators toward said second camera, blocking the passage of light to said second camera based on the programmed pixel data of said first and second magneto-optical light modulators which represents the background, and passing light to said second camera based on the programmed pixel data of said first and second magneto-optical light modulators which represents the earth.

* * * * *